(12) United States Patent
Kull

(10) Patent No.: US 7,465,097 B2
(45) Date of Patent: Dec. 16, 2008

(54) FLUID DYNAMIC BEARING SYSTEM

(75) Inventor: Andreas Kull, Donaueschingen (DE)

(73) Assignee: Minebea Co., Ltd., Nagano-ken (JP)

( * ) Notice: Subject to any disclaimer, the term of this patent is extended or adjusted under 35 U.S.C. 154(b) by 386 days.

(21) Appl. No.: 11/321,028

(22) Filed: Dec. 29, 2005

(65) Prior Publication Data
US 2006/0153479 A1 Jul. 13, 2006

(30) Foreign Application Priority Data
Jan. 7, 2005 (DE) .................. 20 2005 000 155 U

(51) Int. Cl.
*F16C 32/06* (2006.01)
(52) U.S. Cl. ...................... 384/114; 384/100
(58) Field of Classification Search .............. 384/100, 384/107, 114–120; 360/99.08, 98.07; 417/354, 417/423.12, 423.13; 310/90
See application file for complete search history.

(56) References Cited
U.S. PATENT DOCUMENTS

| | | | | |
|---|---|---|---|---|
| 5,210,665 A | * | 5/1993 | Nishizawa | ............... 360/99.08 |
| 5,647,672 A | * | 7/1997 | Fukutani | ..................... 384/100 |
| 6,188,152 B1 | * | 2/2001 | Wakitani et al. | .............. 310/51 |
| 6,469,866 B1 | * | 10/2002 | Nii et al. | .................. 360/99.08 |

\* cited by examiner

*Primary Examiner*—Thomas R Hannon
(74) *Attorney, Agent, or Firm*—Cooper & Dunham LLP

(57) ABSTRACT

The invention relates to a fluid dynamic bearing system particularly to rotatably support a spindle motor to drive the disk(s) of a hard disk drive. The bearing system comprises a bearing sleeve and a shaft accommodated in a bore in the bearing sleeve and rotatably supported with respect to the bearing sleeve, the surfaces of the bearing sleeve and of the shaft, which face each other and are separated by a bearing gap (3) filled with a bearing fluid, forming at least one first radial bearing region. According to the invention the diameter of the shaft is chosen such that the relationship between the bearing distance, i.e. the distance of the fixing point of the shaft to the first radial bearing region, and the diameter of the shaft is equal to or less than 0.9, and that the diameter of the shaft is preferably 3 mm to 5 mm.

This provision causes the resonance frequency of the bearing to shift to a higher, uncritical frequency range.

9 Claims, 3 Drawing Sheets

FLUID DYNAMIC BEARING SYSTEM

BACKGROUND OF THE INVENTION

The invention relates to a fluid dynamic bearing system, particularly a bearing system for a spindle motor to drive the disks in a hard disk drive.

OUTLINE OF THE PRIOR ART

Spindle motors consist substantially of a stator, a rotor and at least one bearing system disposed between these two parts. The electrically driven rotor is rotatably supported with respect to the stator by means of the bearing system. In recent times, fluid dynamic bearing systems have preferentially been employed as bearing systems. A well-known embodiment of a fluid dynamic bearing system, revealed, for example, in DE 201 19 716 U1 comprises a stationary shaft and a bearing sleeve that has an axial bore to receive the shaft. The sleeve rotates freely about the stationary shaft and, together with the shaft, forms two radial bearings and an upper axial bearing. The mutually interacting bearing surfaces of the shaft and sleeve are spaced apart from each other by a thin, concentric, lubricant-filled bearing gap. A surface pattern is formed on at least one of the bearing surfaces which, due to the relative rotary movement between the sleeve and the shaft, exerts local accelerating forces on the lubricant located in the bearing gap and defines a radial bearing region. A kind of pumping action is generated in this way resulting in the formation of a homogeneous lubricating film of regular thickness within the bearing gap, which is stabilized by means of fluid dynamic pressure zones. The bearing sleeve carries a rotor hub on which, for example, the disks of a hard disk drive are disposed. Displacement of the above-described arrangement along the rotational axis is prevented by at least one appropriately designed fluid dynamic axial bearing. In a fluid dynamic axial bearing, the bearing surfaces mutually interacting with each other, of which at least one is provided with a surface pattern, are each arranged on a plane perpendicular to the rotational axis and are spaced axially apart from each other by a thin, preferably even, lubricant-filled bearing gap. The fluid dynamic thrust bearings are preferably formed by the two end faces of a thrust plate arranged at the end of the shaft, one of the end faces of the thrust plate being associated with a corresponding end face of the sleeve and the other end face being associated with the inside end face of a cover. The cover thus forms a counter bearing to the thrust plate and seals the open end of the bearing system, preventing air from penetrating into the bearing gap filled with lubricant.

Due to the fact that the power loss in fluid dynamic bearing systems is proportional to the cube of the radius of the bearing and the reciprocal of the width of the bearing gap, in the past, the radii of the bearing systems were reduced and the bearing gaps enlarged as much as possible in order to keep down power losses. The spindle motors employed in the latest hard disk drives have, for example, a shaft made of stainless steel 1.4028 (X30Cr13=SUS 420 J2) having a shaft diameter of a few millimeters and a Young's modulus of 215 GPa, for example. Gap widths lie in the range of only a few μm. However, as the bearing diameter is made smaller, or the gap width larger, the stiffness of the bearing system is reduced, causing the self-resonances of a bearing system having this kind of design and construction to be shifted to a range of between 500-2000 Hz. The self-resonance of the storage disks lies in this frequency range as well, which means that the bearing resonances could be transmitted to the storage disks in an unfavorable way.

The specifications for spindle motors stipulate vibration tests at frequencies of up to 500 Hz. In the case of more recent developments, the motors are also tested for vibrations in a frequency range between 500 Hz and 2000 Hz. Up to frequencies of approximately 500 Hz, the stiffness of the bearing system has a great influence on the resonance frequencies of a spindle motor. For frequencies of over 500 Hz, the structural stiffness of the bearing components and the components of the motor play a decisive role. For example, the structural stiffness of the shaft has to be significantly greater than the bearing loads exerted by the bearing on the shaft to prevent any deformation to the shaft.

Efforts are thus made in the development of fluid dynamic bearing systems for spindle motors to ensure high bearing stiffness on the one hand, and to minimize disturbing resonances on the other hand.

SUMMARY OF THE INVENTION

The object of the invention is thus to optimize the stiffness and the self-resonances of a fluid dynamic bearing.

This object has been achieved according to the invention by the characteristics outlined in claim 1.

Further preferred and advantageous embodiments of the invention are cited in the subordinate claims.

According to the invention, the diameter of the shaft is chosen such that the relationship between the bearing distance, i.e. the distance of the fixing point of the shaft to the first radial bearing region, and the diameter of the shaft is equal to or less than 0.9.

This provision causes the resonance frequency of the bearing to shift to a higher, uncritical frequency range, preferably significantly above 2 kHz. The defined relationship of the bearing distance to the diameter of the shaft goes to produce optimum stiffness for the first radial bearing region. This results in the amplitude of the resonance dropping to an uncritical value so that the resonances have hardly any effect at all on the storage disks.

In the case of spindle motors, the bearing distance is mostly predetermined according to their design and construction. If the predetermined bearing distance is multiplied by the factor 0.9 according to the invention, this gives us the maximum shaft diameter, which for current spindle motors is between 3.5 and 5.0 mm, for example.

The bearing system preferably comprises a second radial bearing region at a spacing to the first radial bearing region. Moreover, axial bearing regions may be provided which are formed from a thrust plate fixed to the shaft, a counter bearing interacting with the thrust plate, and the bearing sleeve. The bearing system may, however, be axially fixed by other means, such as by using axial ball bearings, axial needle bearings or sliding bearings. The axial bearing can additionally be enhanced by (magnetic) preloading means.

The Young's modulus of the shaft is substantially determined by the material used. According to the invention, the material used in the manufacture of the shaft is a steel alloy with additives of Cr, Mo, W and/or V. This makes it possible to achieve a Young's modulus of greater than 215 GPa. For example, a steel alloy referred to as 1.4535 (X90CrCoMoV17) having a Young's modulus of 230 GPa is suitable. As an alternative to steel, ceramic materials could be used such as $Al_2O_3$ having a Young's modulus of 300-400 GPa, SSiC having a Young's modulus of 410 GPa, SiSiC having a Young's modulus of 350 GPa, or SSN having a Young's modulus of 280 GPa.

In a fluid dynamic bearing system according to the invention that forms a part of a spindle motor, the shaft is connected at its fixing point to a rotor hub of the spindle motor.

BRIEF DESCRIPTION OF THE DRAWINGS

An embodiment of the invention is described in more detail below on the basis of the drawings. Further characteristics, advantages and possible applications of the invention can be derived from the drawings and their description.

DESCRIPTION OF A PREFERRED EMBODIMENT OF THE INVENTION

Figure 1:
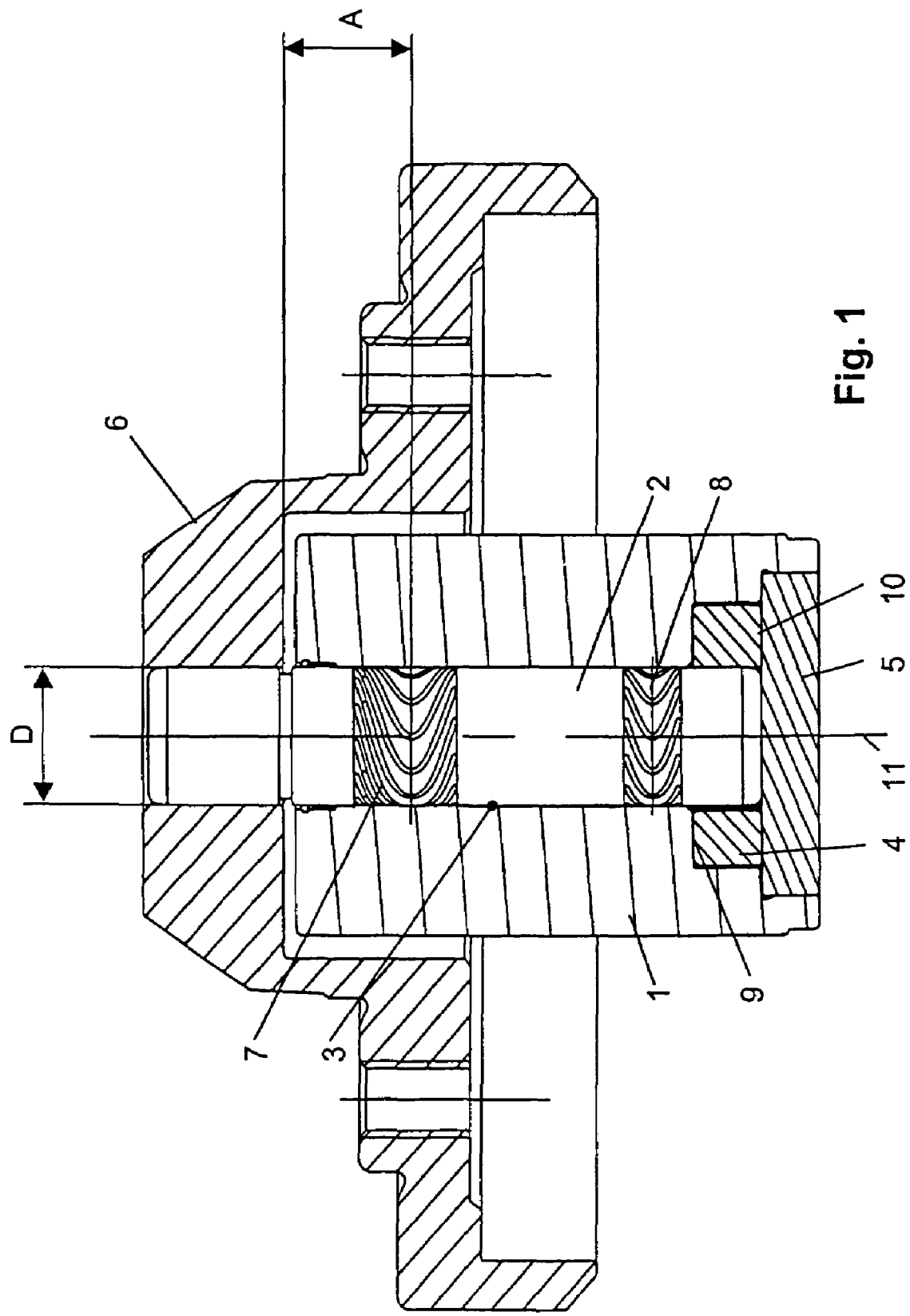
FIG. 1: a schematic sectional view of a fluid dynamic bearing system for a spindle motor having a mounted rotor.

FIG. 1 shows a schematic sectional view of a fluid dynamic bearing system as used in spindle motors to drive a hard disk drive.

The bearing system comprises a bearing sleeve 1 having a concentric axial bearing bore in which a shaft 2 is rotatably accommodated. The inside diameter of the bore of the bearing sleeve 1 is slightly larger than the outside diameter of the shaft 2, so that a bearing gap 3 is formed between the surfaces facing each other of the shaft 2 and the bearing sleeve 1. The bearing gap 3 is filled with a bearing fluid such as bearing oil or even air.

The shaft 2 includes a thrust plate 4 at one of its ends that forms a part of an axial bearing. The thrust plate 4 is accommodated in an annular, larger-diameter recess in the bearing sleeve 1, so that the bearing gap 3 continues between the shaft 2, the thrust plate 4 and the bearing sleeve 1. The thrust plate 4 or the end face of the shaft 2 is covered by a cover plate 5 that forms a counter bearing to the thrust plate 4.

The other, free end of the shaft is connected to a rotor hub 6 that carries one or more storage disks (not illustrated) of a hard disk drive and can be set in rotation together with the shaft 2.

The actual fluid dynamic bearing arrangement is formed, on the one hand, by two radial bearing regions 7, 8 that are marked by surface patterns which are disposed on the outer surface of the shaft 2 and/or the inner surface of the bearing sleeve 1. As soon as the shaft 2 is set in rotation, fluid dynamic pressure is built up in the bearing gap 3 due to the surface patterns of the radial bearing regions 7, 8, providing the radial bearing with its load bearing capacity.

The end faces of the thrust plate 4, i.e. the surfaces aligned perpendicular to the rotational axis, together with the appropriate opposing end faces of the cover plate 5 or of the bearing sleeve 1 respectively, form two axial bearing regions 9, 10 (fluid dynamic thrust bearings). Parts of the surfaces of the axial bearing regions 9, 10 are also provided with appropriate surface patterns that exert a pumping action on the bearing fluid. The shape and design of the surface patterns are known to a person skilled in the art and are thus not illustrated further in the drawings.

Depending on the overall height of the bearing system, which also determines the overall height of the spindle motor holding the bearing system, a bearing distance A can be determined that indicates the distance between the fixing point of the shaft 2 on the rotor hub 6 and the middle of the first radial bearing 7. On the basis of the relationship $$\text{Bearing distance } A / \text{Shaft diameter } D <= 0.9$$

the minimum shaft diameter D can now be ascertained as $$\text{Shaft diameter } D >= \text{Bearing distance } A / 0.9.$$

Figure 2:
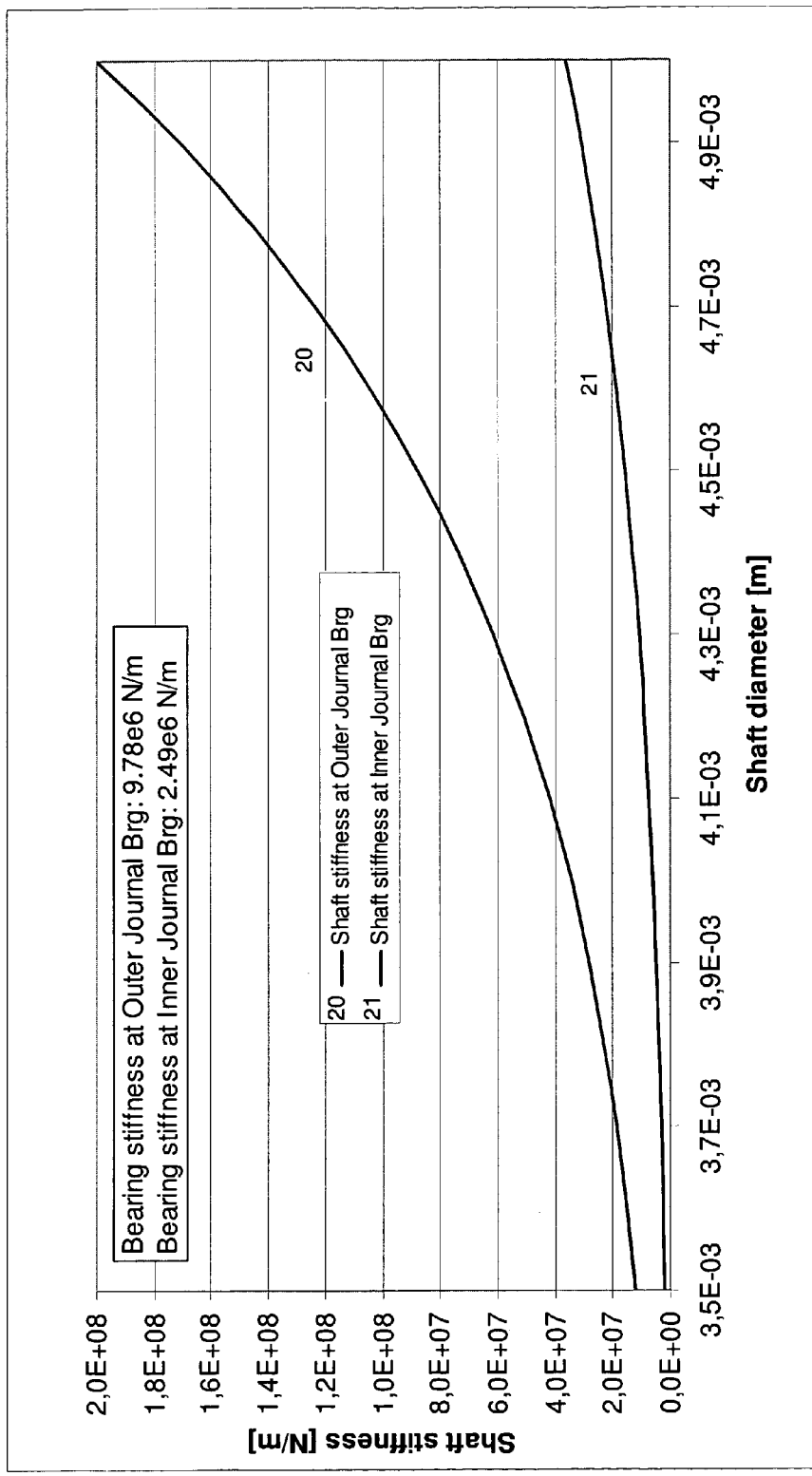
FIG. 2: a diagram of the stiffness of the radial bearing regions of a spindle motor bearing system as a function of the shaft diameter.

FIG. 2 shows an example of a diagram for the stiffness of the shaft 2 of a spindle motor bearing system as a function of the shaft diameter at the radial bearing regions. Curve 20 shows the stiffness of the shaft 2 at the first radial bearing region 7, whereas curve 21 shows the stiffness of the shaft at the second radial bearing region 8.

As could be expected, the stiffness of the shaft 2 becomes greater as the shaft diameter increases. In particular, the stiffness of the shaft 2 at the first radial bearing region 7 is strongly dependent on the shaft diameter, whereas the influence of the shaft diameter on the stiffness of the shaft at the second radial bearing region 8 is relatively minor.

Figure 3:
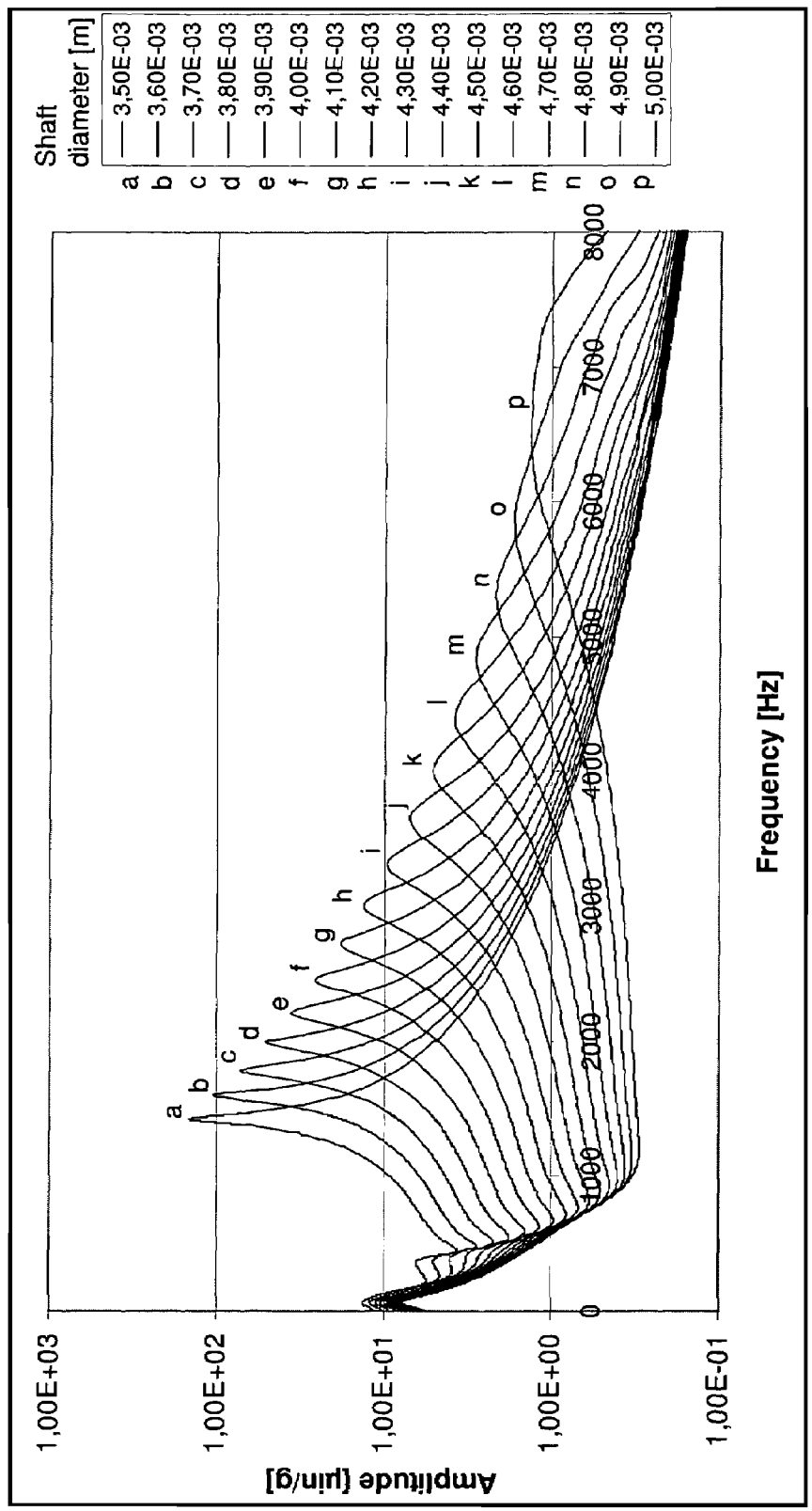
FIG. 3: a diagram of the dynamic resonance frequency response of a spindle motor bearing system as a function of the shaft diameter.

In FIG. 3, an example of a diagram of the dynamic resonance frequency response of a spindle motor bearing system is shown as a function of the shaft diameter. The frequency is plotted on the abscissa, and the vibration amplitude is plotted on the ordinate. The individual curves a to p show the frequency response at different shaft diameters, curve a representing the smallest shaft diameter and curve p the largest shaft diameter. It can be seen that the resonance frequency is larger, the larger the diameter D of the shaft 2. In addition, the vibration amplitudes fall sharply as the shaft diameter D increases.

IDENTIFICATION REFERENCE LIST

1 Bearing sleeve
2 Shaft
3 Bearing gap
4 Thrust plate
5 Cover plate
6 Rotor hub
7 Radial bearing region (first)
8 Radial bearing region (second)
9 Axial bearing region
10 Axial bearing region
11 Rotational axis
D Shaft diameter
A Bearing distance
20 Shaft stiffness at the first bearing
21 Shaft stiffness at the second bearing

The invention claimed is:

1. A fluid dynamic bearing system to rotatably support a shaft (2) within a bearing sleeve (1) and rotatably supported with respect to the bearing sleeve, the surfaces of the bearing sleeve and of the shaft, which face each other and are separated by a bearing gap (3) filled with a bearing fluid, forming at least one first radial bearing region (7), characterized in that
   a bearing distance (A), i.e. the distance between the point where the shaft (2) is fixed to a hub (6) and the middle of the nearest radial bearing region (7), is less than or equal to 0.9 times the diameter D of the shaft (2).

2. A fluid dynamic bearing system according to claim 1, characterized in that it has a second radial bearing region (8) spaced from the first radial bearing region (7).

3. A fluid dynamic bearing system according to claim 1, characterized in that it has axial bearing regions (9; 10) that are formed from a thrust plate (4) fixed to the shaft, a counter bearing (5) interacting with the thrust plate, and the bearing sleeve.

4. A fluid dynamic bearing system according to claim 1, characterized in that the shaft is made of a steel alloy having additives of CR, Mo, W and/or V and has a Young's modulus of greater than 215 GPa.

5. A fluid dynamic bearing system according to claim 1, characterized in that the shaft is made of a ceramic material having a Young's modulus of greater than 215 GPa.

6. A fluid dynamic bearing system according to claim 1, characterized in that the system is part of a spindle motor.

7. A fluid dynamic bearing system according to claim 6, characterized in that the shaft (2) is connected at its fixing point to a rotor hub (6) of a spindle motor.

8. A fluid dynamic bearing system according to claim 1, characterized in that the diameter (D) of the shaft is from 3 mm to 5 mm.

9. A spindle motor device including a fluid dynamic bearing system to rotatably support the disk(s) of a hard disk drive having a bearing sleeve (1) and a shaft (2) within a bearing sleeve and rotatably supported with respect to the bearing sleeve, the surfaces of the bearing sleeve and of the shaft, which face each other and are separated by a bearing gap (3) filled with a bearing fluid, forming at least one first radial bearing region (7), characterized in that a bearing distance (A), i.e. the distance between the point where the shaft (2) is fixed to a hub (6) and the middle of the nearest radial bearing region (7), is less than or equal to 0.9 times the diameter D of the shaft (2).

* * * * *

(12) EX PARTE REEXAMINATION CERTIFICATE (9343rd)
United States Patent
Kull

(10) Number: US 7,465,097 C1
(45) Certificate Issued: Oct. 5, 2012

(54) FLUID DYNAMIC BEARING SYSTEM

(75) Inventor: Andreas Kull, Donaueschingen (DE)

(73) Assignee: Minebea Co., Ltd., Miyota-Machi, Kitasaku-Gun, Nagano-Ken (JP)

Reexamination Request:
No. 90/012,026, Nov. 28, 2011

Reexamination Certificate for:
Patent No.: 7,465,097
Issued: Dec. 16, 2008
Appl. No.: 11/321,028
Filed: Dec. 29, 2005

(30) Foreign Application Priority Data

Jan. 7, 2005 (DE) .................... 20 2005 000 155 U

(51) Int. Cl.
*F16C 32/06* (2006.01)
(52) U.S. Cl. .................. 384/114; 384/100; G9B/19.029
(58) Field of Classification Search .................. 384/100, 384/111
See application file for complete search history.

(56) References Cited

To view the complete listing of prior art documents cited during the proceeding for Reexamination Control Number 90/012,026, please refer to the USPTO's public Patent Application Information Retrieval (PAIR) system under the Display References tab.

*Primary Examiner* — Matthew C. Graham

(57) ABSTRACT

The invention relates to a fluid dynamic bearing system particularly to rotatably support a spindle motor to drive the disk(s) of a hard disk drive. The bearing system comprises a bearing sleeve and a shaft accommodated in a bore in the bearing sleeve and rotatably supported with respect to the bearing sleeve, the surfaces of the bearing sleeve and of the shaft, which face each other and are separated by a bearing gap (3) filled with a bearing fluid, forming at least one first radial bearing region. According to the invention the diameter of the shaft is chosen such that the relationship between the bearing distance, i.e. the distance of the fixing point of the shaft to the first radial bearing region, and the diameter of the shaft is equal to or less than 0.9, and that the diameter of the shaft is preferably 3 mm to 5 mm.
This provision causes the resonance frequency of the bearing to shift to a higher, uncritical frequency range.

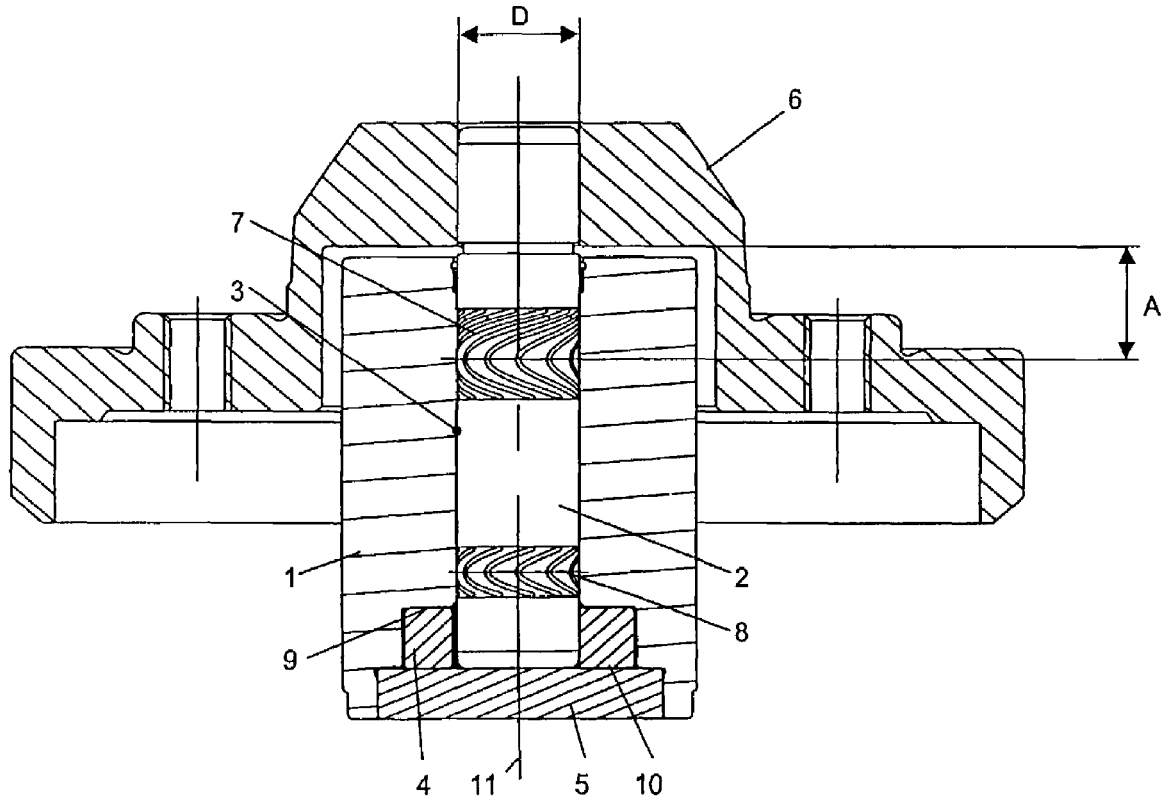

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-3 are cancelled.

Claims 1 and 9 are determined to be patentable as amended.

Claims 4-8, dependent on an amended claim, are determined to be patentable.

New claims 10-14 are added and determined to be patentable.

1. A fluid dynamic bearing system to rotatably support a shaft (2) within a bearing sleeve (1) and rotatably supported with respect to the bearing sleeve, the surfaces of the bearing sleeve and of the shaft, which face each other and are separated by a *lubricant-filled* bearing gap (3) filled with a bearing fluid, forming [at least one] *a* first radial bearing region (7) *and a second radial bearing region (8) spaced apart from the first radial bearing region (7) in an axial direction, and axial bearing regions (9; 10) that are formed from a thrust plate (4) fixed to the shaft, a counter bearing (5) interacting with the thrust plate, and the bearing sleeve,* characterized in that a bearing distance (A), i.e. the distance between the point where the shaft (2) is fixed to a hub (6) and the middle of the nearest radial bearing region (7), is less than or equal to 0.9 times the diameter D of the shaft (2).

9. A spindle motor device including a fluid dynamic bearing system to rotatably support the disk(s) of a hard disk drive having a bearing sleeve (1) and a shaft (2) within a bearing sleeve and rotatably supported with respect to the bearing sleeve, the surfaces of the bearing sleeve and of the shaft, which face each other and are separated by a *lubricant-filled* bearing gap (3) filled with a bearing fluid, forming [at least one] *a* first radial bearing region (7) *and a second radial bearing region (8) spaced apart from the first radial bearing region (7) in an axial direction, and axial bearing regions (9; 10) that are formed from a thrust plate (4) fixed to the shaft, a counter bearing (5) interacting with the thrust plate, and the bearing sleeve,* characterized in that a bearing distance (A), i.e. the distance between the point where the shaft (2) is fixed to a hub (6) and the middle of the nearest radial bearing region (7), is less than or equal to 0.9 times the diameter D of the shaft (2).

*10. A fluid dynamic bearing system according to claim 1, characterized in that the shaft (2) has a width that is substantially uniform along the shaft (2).*

*11. A fluid dynamic bearing system according to claim 1, characterized in that the shaft (2) has an upper region connected to and enclosed by the hub and a lower region enclosed by the bearing sleeve.*

*12. A fluid dynamic bearing system according to claim 11, characterized in that the upper region has a substantially uniform first width and the lower region has a substantially uniform second width.*

*13. A fluid dynamic bearing system according to claim 12, characterized in that the first width and the second width are equal.*

*14. A fluid dynamic bearing system according to claim 12, characterized in that the upper region and the lower region are separated by a groove in the shaft (2).*

\* \* \* \* \*